INVENTORS
J. A. Harrison
B. Quartermain

United States Patent Office 3,322,961
Patented May 30, 1967

3,322,961
METHOD AND APPARATUS FOR CONTROLLING THE LENGTH OF STRIP MATERIAL
James Arthur Harrison and Brian Quartermain, Chesterfield, England, assignors to Davy and United Engineering Company Limited, Sheffield, England
Filed Dec. 13, 1962, Ser. No. 244,512
Claims priority, application Great Britain, Dec. 13, 1961, 44,611/61
15 Claims. (Cl. 250—219)

This invention relates to automatic control of the movement of material in elongate form, and particularly to a method and apparatus for stopping the material at a preselected position.

In one aspect the invention comprises a method of automatically stopping material in elongate form when a preselected length of that material has passed a fixed point, which method includes the steps of counting pulses which are generated each time the material travels a unit distance and comparing the count of these pulses with a count set up according to the preselected length, thus providing a difference signal to control the movement of the material and stop the material at the required position.

The invention further comprises a method for automatically stopping a material in elongate form when a preselected length of that material has passed a fixed point, which method includes the steps of decelerating the material as it approaches the required position, and at some stage after initial deceleration counting pulses which are generated each time the material travels a unit distance and comparing these pulses with a count set up according to the preselected length, thus providing a difference signal to control a driving motor and stop the material at the required position.

In accordance with another aspect of the invention, apparatus for automatically stopping material in elongate form when a preselected length of that material has passed a fixed point, comprises means for generating pulses each time the material travels a unit distance, means for counting the pulses so generated and for comparing the count with a count set up according to the preselected length, to produce a difference signal, and means controlled by the difference signal for controlling the movement of the material to stop the material at the required position.

The invention may be applied to the cutting of material in elongate form into beams of selected lengths, in which case the fixed point referred to above may be the saw.

Figure 1:
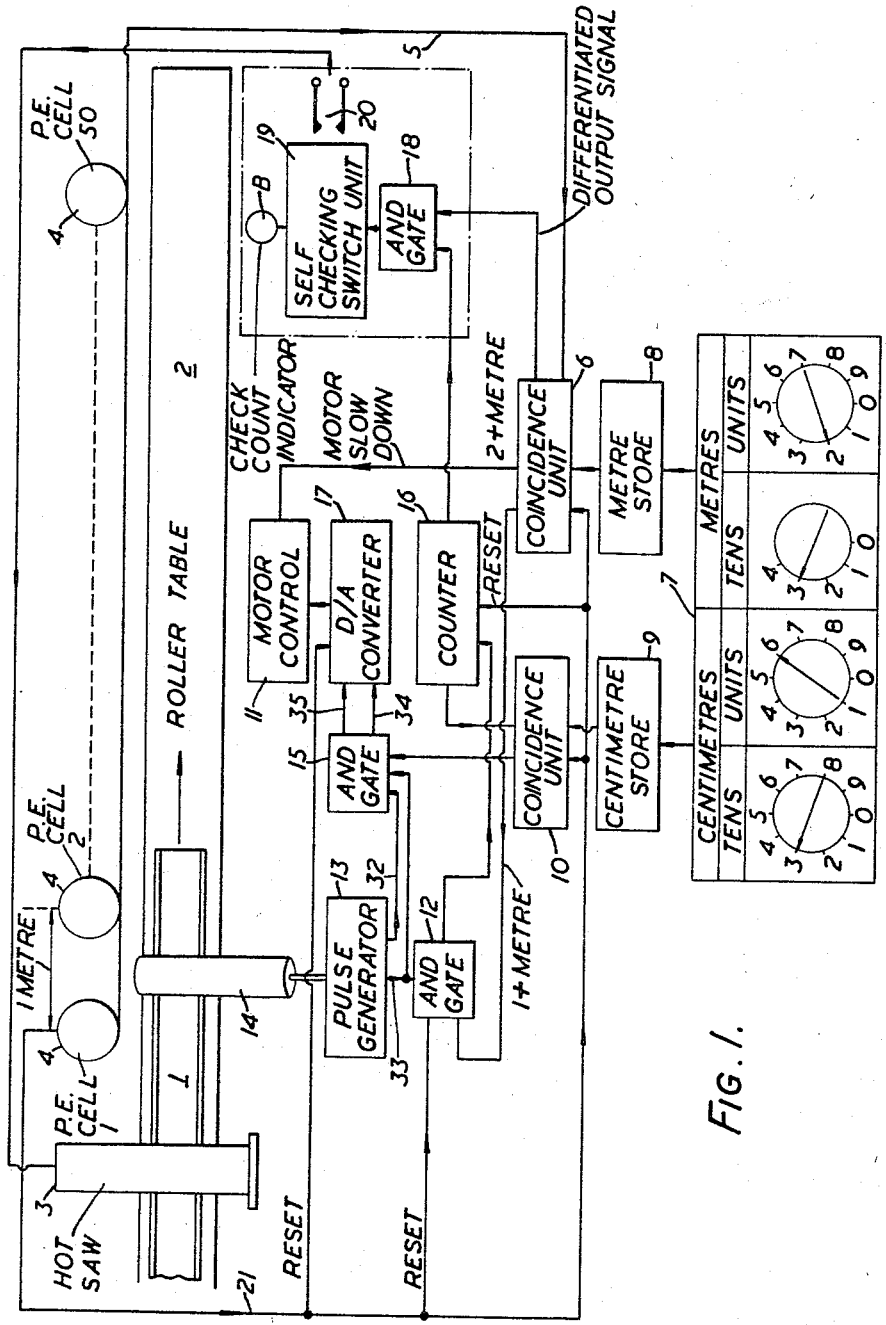
Figure 2:
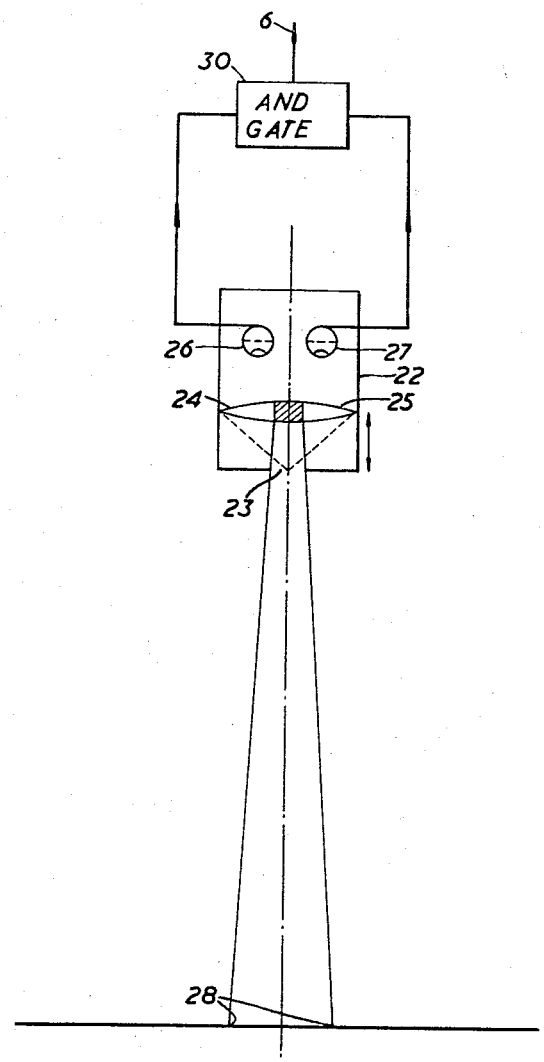

One embodiment according to the invention will now be described by way of example with reference to the accompanying drawings of which:

FIGURE 1 is a block diagram schematically illustrating an automatic control system for stopping a beam when a preselected length of from three to fifty metres has passed a saw, and FIGURE 2 illustrates in detail a photocell head unit used in the system of FIGURE 1.

FIGURE 1 shows a beam 1 of hot material travelling along a roller table 2 and passing a saw 3. A series of photocell units 4 are situated along the roller table at one-metre intervals from the saw on the outgoing side, covering a length of fifty metres.

Each of the photocell units 4 is of the form shown in FIGURE 2 and, as will be described in greater detail below, each photocell unit 4 is arranged to give an electrical step-function output signal when the leading edge of the beam passes the photocell unit in question. Each such output signal is separately fed to a coincidence unit 6 over a corresponding line, but in FIGURE 1 the outputs of the photocell units have for simplicity been shown as connected by a common line 5 to the coincidence unit 6.

The saw operator has controls 7 to preselect the required beam length in units of metres and centimetres, over a range from three to fifty metres. When the required beam length is thus set up, the metre and centimetre lengths concerned are stored respectively in metre and centimetre stores 8 and 9 and when required the metre and centimetre stores 8 and 9 are respectively connected to coincidence units 6 and 10.

The coincidence unit 6 compares the preselected metre length with the output signals received from the photocell units 4. The arrangement of the coincidence unit 6 is such that when it receives an output signal from that photocell unit which is two metres in advance of the photocell unit corresponding to the metre store length, the coincidence unit 6 transmits a signal to a motor control unit 11, causing the motor speed to be reduced and so reducing the speed of the roller table to, say, quarter-speed. This reduction of speed is preferably at a uniform rate of deceleration.

Furthermore, when the coincidence unit 6 receives an output signal from that photocell unit which is one metre in advance of the photocell unit corresponding to the preselected metre length, the coincidence unit 6 transmits a signal to open an AND gate 12.

Moreover, when the coincidence unit 6 receives an output signal from that photocell unit 4 which corresponds to the preselected metre length, then the coincidence unit 6 transmits a signal to open AND gate 18 for a short period; the signal transmitted to the gate 18 is preferably obtained by differentiation of the step-function output signal received from the photocell unit in question, so that the gate 18 is opened and then quickly closed.

A pulse generator 13 is coupled via gearing to a measuring roller 14, which is as wide as the rollers of the table and is pressed against the flange of the beam. Alternatively the pulse generator may be driven from the gearbox drive of the roller table. In either case, the pulse generator is arranged to emit, to a line 33, one pulse for each millimetre of forward movement of the beam 1, such pulses being fed, as indicated in FIGURE 1, to the AND gate 12 and also to the AND gate 15 whence, if the gate 15 is open, the pulses pass over a line 34 to one input of a bidirectional digital-to-analogue converter 17. The pulse generator 13 is also arranged to emit, to a line 32, one pulse for each millimetre of backward movement of the beam 1, such pulses being fed to the AND gate 15 and thence, if the gate 15 is open, over a line 35 to a second input of the digital-to-analogue converter 17.

When the AND gate 12 is opened by the signal from coincidence unit 6 the pulses are counted in counter 16 which transmits to the centimetre coincidence unit 10 electrical signals representing the count of the pulses received from the generator 13. The unit 10 is arranged to emit a signal to open AND gate 15, when the count represented by the electrical signals fed to it from the counter 16 equals the centimetre store number (that is to say, a count of ten times the preselected centimetre length) plus eight hundred. In other words, the unit 10 emits a signal to AND gate 15 when the beam is 200 mm. from the position set up on the control 7. The pulses from the pulse generator 13 are then fed over line 33, through gate 15, and over line 34 into the bidirectional digital-to-analogue converter 17 which produces an error signal which decreases progressively as the number of pulses fed to it increases from zero to 200 and which is applied to the control circuit 11. The error signal controls the control circuit 11 to slow down the roller table 2 in accordance with the magnitude of the error signal, the roller table being stopped when the error signal reaches zero at a count of 200, i.e. the required position has been achieved. Should overshoot occur, the leading edge of the beam passing beyond the position at which it is required to stop, then the error signal generated by the digital-to-analogue converter is arranged to cause reversal of the direction of the roller-table drive. When, under these conditions, the beam is moved backwards, the pulse generator 13 transmits over line 32, through AND gate 15, and over line 35, one pulse per millimetre of backward movement of the beam; such pulses, fed into the second input of the digital-to-analogue converter 17 suitably reduce the error signal generated by the converter 17. The motor control system may include a Ward Leonard rectifier or similar A.C. voltage system or a constant contactor control with reversing facilities.

As described above, the roller table speed is proportionally controlled by the error signal from the converter 17 and is brought progressively to zero at the required stopping position. Alternatively, there may be an ON/OFF control for the roller table motor, the speed remaining uniform while the error signal is above a given value and the motor being switched off when error signal falls below that value so that the beam is brought to rest at the required point.

Automatic self-checking is preferably incorporated. Thus, the counter 16 is arranged to feed to the AND gate 18 an electrical signal representing the total number of pulses received by the counter 16 from the generator 13. It will be appreciated that when, as described above, the gate 18 is opened, by the signal from the coincidence unit 6, this electrical signal should represent a count of 1000 since, during the interval between the opening of the gates 12 and 18, the leading edge of the beam has travelled a distance of one metre, the spacing between the photocell units 4. In the apparatus being described, however, an error of ±5 mm. is allowed; thus, when the gate 18 has been opened, the electrical signal from the counter 16 is transmitted, through the AND gate 18, to a self-checking switch unit 19. The unit 19 tests the magnitude of the electrical signal from the counter 16; if this magnitude represents a count of between 995 and 1005 pulses by the counter 16, then unit 19 operates an indicator B to indicate correct operation of the apparatus, and closes a pair of relay contacts 20 to permit subsequent operation of the saw 3. If the magnitude of the electrical signal from the counter 16 represents a count not within the range 995–1005, then an alarm may be given by indicator B, and relay contacts 20 remain open to prevent subsequent operation of the saw 3. As described above, the gate 18 is opened and then quickly closed, by the coincidence unit 6, so as to permit the self-checking switch unit 19 to substantially instantaneously check the electrical signal fed to it, through the gate 18, from the counter 16.

When the beam has been cut, and the trailing edge of the cut length passes the photocell unit 4 nearest to the saw, this photocell unit becomes de-energised and causes a resetting pulse to be applied to line 21. This resetting pulse is applied to coincidence units 6, 10, AND gate 12, counter 16 and converter 17 to reset the system in readiness for the arrival of the leading edge of the uncut beam.

While one beam is being cut the operator may preselect the length of the next beam. Suppose for example he selects the length 8.6 metres. When the trailing edge of previously cut beam length passes the photocell unit 4 one metre from the saw this new preselected length is transferred from the stores 8, 9 to the coincidence units 6, 10 respectively. When the uncut beam has travelled six metres, the coincidence unit 6 emits the signal to the control circuit 11 and the roller table is decelerated to a quarter of full speed. When 7 metres have been covered, the gate 12 is opened. The initial deceleration, occurring before the opening of this gate, is introduced so that in the event of any slip occurring between the beam and the measuring roller during the deceleration period, and this is when the possibility is greatest, the stopping accuracy is not affected.

When the leading end of the beam reaches the seventh cell 4, the resulting pulse from coincidence unit 6 opens gate 12 and counter 16 starts to count the pulses from generator 13. As the beam should move a further 1.6 metres, the beam should be stopped when counter 16 contains a count of 1600. When 1400 pulses have been counted, gate 15 is opened and the remaining 200 pulses are fed into the converter 17 which produces an analogue error signal representing the difference between a count of 200 and the number of pulses passed by gate 15. This error signal, which decreases progressively and reaches zero when the beam attains the requisite position, controls the circuit 11 to bring the roller table to rest with the beam at that position. As explained above, provision is made for overshoot of the leading edge of the beam.

For successful operation the trailing edge of the front beam and the leading edge of the following beam must be spaced by at least one metre. For this reason, the circuitry is set up to ensure that after a cut has finished the outgoing roller table is started before the ingoing roller table.

The photocell units 4, one of which is illustrated in FIGURE 2, are arranged in the present instance to be actuated by the energy radiated from the hot beam; however, it is evident that in modifications of the invention, the photocell units could be arranged to be operated in any suitable manner by radiant energy which is either interrupted, or conveyed to the photocell units, when the leading edge of the beam passes the photocell unit in question.

Referring to FIGURE 2, each photocell unit 4 is arranged to emit an electrical step-function output signal, as referred to above, when the leading edge of the beam arrives within a zone 28; each photocell unit is so designed that the zone 28 is relatively small. Thus, each photocell unit includes a container 22 having a slit 23 through which radiation from the beam is received, a split lens having two radiation-transmitting parts 24, 25 mounted at a distance from the slit equal to its focal length; and photocells 26, 27 mounted behind the lens so that radiation passing through lens part 24 is received by cell 26 but not by cell 27 and radiation passing through lens part 25 is received by cell 27 but not by cell 26.

As the leading edge of the beam approaches the zone 28, radiation will be received by one of the two photocells 26 and 27, but not by the other photocell until the beam passes within the zone 28. When either of the photocells 26 and 37 is energised by such radiation, it transmits a signal to an AND gate 30. When the gate 30 first receives signals from both photocells 26 and 27, indicating that the leading edge of the beam has arrived within the zone 28, the AND gate 30 is arranged to transmit to the coincidence unit 6 an electrical step-function output signal, as described above. The object of the split lens and two photocells is to narrow the receiving zone 28 without decreasing the quantity of radiation received from that zone by narrowing the slit.

The size of the angular zone 28 for which radiation passes through both parts of the lens is determined by the relation between the distance of the photocell unit 4 from the hot object, the width of the slit 23, the separation of the two lens parts 24, 25 and the focal length of the lens. The zone 28 sharply defined for operation of the AND gate 30, and may be as small as ½ centimetre with the photocell unit some 200 centimetres distant from the hot object.

We claim:

1. Apparatus for controlling driving means for advancing elongated material past a fixed point, said apparatus comprising a pulse generator for generating a pulse for each unit of distance travelled by said material, a counter for counting said pulses, storage means for storing an indication of a desired count corresponding to the passage of a preselected length of said elongated material past said point, a comparing circuit for comparing the count of the pulses generated by said counter with said indicated count, means controlled by said comparing circuit for generating from the time that only a predetermined portion of said preselected length remains to pass said fixed point a controlling signal which varies as the portion of said preselected length yet to pass said point decreases, and speed regulating means controlled by said controlling signal to gradually reduce the speed at which said drive means is driven and finally stop it when said preselected length of material has passed said point.

2. Apparatus as claimed in claim 1 in which said pulse generating means is actuated through said comparing circuit to generate an advance control signal preceding said first mentioned controlling signal and said speed regulating means is actuated by said advance control signal to decrease the speed at which said drive means is driven by a predetermined percentage independently of the first mentioned control signal.

3. Controlling apparatus according to claim 1 comprising a saw at the fixed point for cutting off the preselected length.

4. Controlling apparatus according to claim 1 in which the comparing circuit is arranged to direct further pulses to the controlling signal generating means, when the distance represented by the pulse count differs from the preselected length by a given amount.

5. Controlling apparatus according to claim 4 in which the controlling signal generating means is arranged to reduce said controlling signal progressively to zero as the portion of said preselected length yet to pass said point decreases to zero.

6. Controlling apparatus according to claim 1, comprising a plurality of devices each adapted to detect the material and spaced along the path of the material at equal spacings which are multiples of the units of distances, said storage means being settable to the required length in terms of the number of spacings and the number of units of distance, and means for directing the pulses to the pulse counter which is controlled by the detecting devices and said storage means and is rendered operative when a given detecting device detects the material.

7. Controlling apparatus according to claim 6 comprising checking means for counting the number of pulses generated between the detection of the material by two successive detecting devices and for giving an indication when the count differs from the correct value.

8. Controlling apparatus according to claim 6 in which the comparing circuit is controlled by the count and by the number of units of distance set up on the storage means.

9. Controlling apparatus according to claim 8 in which the comparing circuit is arranged to apply to the controlling signal generating means the generated pulses when the count differs from the number of units set up by a fixed amount.

10. In apparatus for conveying elongate material past a fixed point, a control system for stopping the material when a preselected length has passed said point, the control system comprising a controlling device for controlling the movement of said material, pulse generating means for generating a single pulse for each unit of movement of said material, a counter for counting pulses from said pulse generating means, a detecting circuit settable according to said preselected length and controlled by said counter for generating a control signal when the further distance to be travelled by said material reaches a fixed value independent of said preselected length, and means operated by said control signal for directing subsequent pulses to said controlling device to bring said material to reset after traversal of said further distance of fixed value.

11. In combination with conveying apparatus for conveying elongate material along a predetermined path past a fixed point, a control system for stopping the material when a preselected length has passed said point, the control system comprising a controlling device for controlling said conveying apparatus, means settable to said preselected length, pulse generating means for generating a single pulse for each unit of movement of said material past said point, a counter for counting pulses from said pulse generating means, a comparing circuit responsive to said counter and said settable means for giving a control signal when the distance represented by the count of said counter differs from said preselected length by a fixed distance independent of said preselected length, and means operated by said control signal for directing subsequent pulses to said controlling device to bring said conveying apparatus to rest after traversal of the material of said fixed distance.

12. In a control system for stopping the movement of elongate material along a predetermined path when a preselected length of said material has passed a fixed point in said path, comprising a plurality of detecting devices spaced at known distance along said path and pulse generating means for generating a pulse for each unit of movement of said material; a checking circuit for checking the accuracy of said generating means comprising a counter for counting said pulses, first gate means controlled by a first of said detecting devices for directing pulses from said generating means to said counter, second gate means operated by a second of said detecting devices subsequent to said first device for reading out the count in said counter, and a checking device to which said second gate means is operatively connected for checking that said count read out represents the distance between said first and second detecting devices.

13. A control system for stopping the movement of elongate material along a predetermined path when a preselected length of said material has passed a fixed point in said path, comprising a plurality of detecting devices spaced at known distances along said path, pulse generating means for generating a pulse for each unit of movement of said material past said point, manually operable preselecting means settable to said preselected length, control means controlled jointly by said detecting devices and said preselecting means to reduce the speed of movement of the material when the leading end of said material passes a given one of said detecting devices determined by said preselecting means, means controlled by said pulse generating means for stopping said material when said preselected length has passed said point, a counter for counting pulses generated by said pulse generating means, first gate means controlled by a second of said detecting devices for directing pulses from said generating means to said counter, said second detecting device being located downstream of said given one, second gate means operated by a third of said detecting devices subsequent to said second device for reading out the count in said counter, and a checking device to which said second gate means is operatively connected for checking that said count read out from said counter represents the distance between said first and second detecting devices.

14. Apparatus for controlling driving means for advancing elongated material past a fixed point, said apparatus comprising a pulse generator for generating a pulse for each unit of distance travelled by said material, a counter for counting said pulses, storage means for storing an indication of a desired count corresponding to the passage of a preselected length of said elongated material past said point, a comparing circuit for comparing the count of the pulses generated by said counter with said indicated count, means controlled by said comparing circuit for generating a control signal when only a predetermined portion of said preselected length remains to pass said fixed point, and speed regulating means controlled by said control signal to reduce the speed at which said drive means is driven by a predetermined percentage less than 100% of its prior speed.

15. Apparatus for controlling driving means for advancing elongated material past a fixed point, said apparatus comprising a pulse generator for generating a pulse for each unit of distance travelled by said material, a counter for counting said pulses, storage means for storing an indication of a desired count corresponding to the passage of a preselected length of said elongated material past said point, a comparing circuit for comparing the count of the pulses generated by said counter with said indicated count, means controlled by said comparing circuit for generating a control signal when only a predetermined portion of said preselected length remains to pass said fixed point, and speed regulating means controlled by said control signal to stop said drive means when said preselected length has passed said fixed point.

References Cited

UNITED STATES PATENTS

| | | | |
|---|---|---|---|
| 2,738,007 | 3/1956 | Power et al. | 83—364 X |
| 2,777,069 | 1/1957 | Saeman | 250—219.1 |
| 2,931,916 | 4/1960 | Sinn | 250—219.1 |
| 2,941,086 | 6/1960 | Gottschall et al. | 250—219.1 |
| 2,978,943 | 4/1961 | Balint | 250—219.1 |
| 2,994,783 | 8/1961 | Looschen | 250—219.1 |
| 2,994,784 | 8/1961 | White et al. | 250—219.1 |
| 3,013,459 | 12/1961 | Coleman | 226—33 X |
| 3,020,033 | 2/1962 | McCreanor et al. | 250—219.1 |
| 3,025,740 | 3/1962 | Sorkin | 83—365 X |
| 3,033,991 | 5/1962 | Sampson | 250—219.1 |
| 3,061,732 | 10/1962 | Milnes | 250—219.1 |
| 3,066,226 | 11/1962 | Lindstrom | 250—223 X |
| 3,082,368 | 3/1963 | Rowe | 83—364 X |
| 3,143,017 | 8/1964 | Donnell | 83—365 X |

RALPH G. NILSON, *Primary Examiner.*

ARCHIE R. BORCHELT, *Examiner.*

M. A. MEAVITT, E. STRICKLAND,
*Assistant Examiners.*